United States Patent Office 3,709,930
Patented Jan. 9, 1973

3,709,930
PETROLEUM COKE ACID SALTS
Robert M. Alm, Crown Point, Ind., assignor to Standard Oil Company, Chicago, Ill.
No Drawing. Filed Feb. 16, 1968, Ser. No. 705,911
Int. Cl. C07c 63/00
U.S. Cl. 260—515 H                    2 Claims

ABSTRACT OF THE DISCLOSURE

Process for the production of novel composition useful as soil beneficiation agent and product produced by such process, such process comprising oxidizing petroleum coke to form the coke acid, and neutralizing such acid with basic alkali metal compound and/or ammonium compound.

BACKGROUND OF THE INVENTION

This invention relates to a novel composition of matter and a process for producing such composition, and more specifically, to alkali metal or ammonium salt of a coke acid useful as soil beneficiation agent.

Much research work has been done recently in improving the physical properties of poor soils and increasing the retention and availability of fertilizers and trace elements. As the need increases for higher yields of vegetation per given area of soil, so will the demand for soil beneficiation agents increase. Because of the large areas of land which must be treated and the quantity necessary to treat the soil, it is highly desirable that beneficiation agents be effective at as low a concentration per given area of soil as possible. Of course, the soil beneficiation agent should be relatively inexpensive in order to find use in the market place.

Prior art products have generally suffered from the disadvantage of the necessity of too large an application rate in order to accomplish significant improvement.

SUMMARY OF THE INVENTION

A novel class of compounds have now been discovered which are useful as soil beneficiation agents having none of the disadvantages above mentioned.

Briefly, the compounds of the present invention comprise alkali metal or ammonium salts of coke acids. The petroleum coke derived salts are useful because of their polynuclear structure and the fact that such salts are water soluble. Water solubility is necessary in order to provide the compounds in the soil in a useful manner.

The salts may be prepared by the controlled oxidation of petroleum coke to form the coke acid, and the subsequent neutralization of the acid to form the salt. It has been found that the alkali metal and ammonium salts are highly water soluble and are therefore preferred.

A preferred method of oxidizing the petroleum coke is by use of aqueous nitric acid in the concentration range of from 20% to 80%, by weight in water. The nitric acid serves as both the oxidant and medium for oxidation of suspended petroluem coke. Net consumption of nitric acid may be minimized by continuous air oxidation of the off-gases that contain reduced oxides of nitrogen, followed by re-cycling and readsorption to maintain the nitric acid concentration in the reaction medium.

More specifically, suspended, finely divided coke is oxidized at atmospheric or elevated pressures in either a batch type reactor or a continuous suspension flow system. The suspended coke acid is then separated by filtration and the filtrate, aqueous nitric acid solution, may then be re-cycled for re-use in the oxidation. The crude coke acid produced may then be washed with water to remove any trace of nitric acid.

When carrying out the oxidation reaction at atmospheric pressure, the coke:nitric acid ratio may be in the range of from 1:2 to 1:10 by weight, preferably 1:5. The preferred concentration of the nitric acid is 35% to 55% by weight. The reaction temperature may vary from 50° C. to 125° C. It is preferred that the temperature initially be at the lower portion of this range and then gradually increased to the upper portion of the range at the end of the reaction period. The reaction period may vary from 5 to 24 hours, depending upon the degree of agitation in the reactor, the degree of sub-division of the coke, the concentration of the aqueous nitric acid and the rate of increase of temperature. For example, a 50 weight percent aqueous nitric acid solution, with a coke:acid ratio of 1:5 by weight, which is vigorously agitated, may be heated from 60° C. to 120° C. for a 6 to 8 hour period to complete oxidation of the coke.

The neutralization reaction is carried out in any suitable solvent, for example, water, water-acetone, water-tetrahydrofuran, etc. The alkali metal may be in the form of the hydroxide or oxide, and the ammonium compound in the form of the hydroxide. The quantity of base should be sufficient to neutralize the acid. It is preferred that substantially all the carboxyl groups be neutralized. Therefore, a pH of 7 or slightly higher is desirable. The temperature of the neutralization reaction should be sufficient to effect substantially complete solution of the product salt. After neutralization, the aqueous solution may be used as is or the salt may then be purified and dried.

DESCRIPTION OF PREFERRED EMBODIMENTS

Example I

Oxidation of petroleum coke to form coke acids.—400 g. of petroleum coke was suspended in 2500 ml. (2856 g.) of 55% $HNO_3$ within a 3-necked 5 l. round-bottomed flask. The flask was equipped with a stirring rod and paddle inserted through the center neck. An efficient condenser and thermowell were connected to each of the two remaining side necks, respectively. The raw coke (about 20–40 mesh range) was stirred as a suspension while the reactor system temperature was raised from 25° C. to 112° C. during the first 8 hours of reaction time. By-product gases from oxidation were vented out the condenser side during the course of reaction.

At the end of 8 hours reaction time, the spent aqueous $HNO_3$ solution was withdrawn from the suspension and realaced with a second charge of 2500 ml. (2856 g.) of 55% aqueous $HNO_3$. The reaction was continued for a second 8-hour period over a temperature range of 85° C. to 115° C. with most of the second reaction period at 100° C. to 118° C. At the completion of the second stage of oxidation, the reaction product suspension was cooled to 25° C. and the suspended coke acid product separated from unreacted aqueous $HNO_3$ by filtration.

The crude acid reaction product was washed with cold water; five consecutive washes of 2000 ml. volume per wash. The washed, finely divided product was dried in a vacuum oven to remove last traces of water. Yield of product was 480 g. having a neutralization equivalent of 240–260 mg. KOH/g.

ELEMENTAL ANALYSIS

|   | Wt. percent |
|---|---|
| C | 63.2 |
| H | 2.6 |
| O | 27.2 |
| N | 4.5 |
| S | 2.5 |

Example II

Salt preparation.—One equivalent of sodium hydroxide was added in water to coke acid having a neutralization equivalent of between 240 and 260 mg. KOH/g. The reaction was carried out at room temperature and at atmospheric pressure. The salt solution comprised about 5% coke acid salt in water.

Example III

The procedure of Example II was followed except ammonium hydroxide was used.

The following tests were performed to demonstrate the effectiveness of the products of the present invention:

Water drop test.—100 g. of soil is mixed with additive and then enough water added to get sticky mass. This is forced through a 6 mesh/inch screen and allowed to stand overnight on a watch glass to air dry. A lump of the air-dried material weighing 0.14 to 0.15 g. is placed on a 20 mesh screen and drops of water from a burette with the tip 30 cm. above the screen are dropped on the lump at a rate of 1 drop/4 second until the lump disintegrates. The number of drops is recorded.

Wet sieving test.—A weighed sample of air-dried soil to which additive has been added is placed on a 20 mesh screen which is the top screen of a series containing a 20, 40 and 60 mesh screen. This is then placed in an apparatus that raises and lowers the screens 1¼″ in water at a rate of 30 cycles/minute. After 30 minutes, the screens are removed, dried, and the amount of soil remaining on each screen measured.

Soils (1) Clay. Dug from the 18–24″ layer of garden. pH= 5.8.
(2) Garden soil. Top 6″ from gray silt loam soil.

Acids (1) Total coke acids.
(2) Soluble acids—about 30–35% of the total coke acids that can be extracted with methyl ethyl ketone.
(3) Insoluble acids—the residue from MEK extraction.

Listed below are the results of the above tests:

TABLE I
Water Drop Test

| | Sample | | | |
|---|---|---|---|---|
| | a | b | c | d |
| Soil | Clay | Clay | Clay | Clay. |
| Additive | None | $NH_4$ salt of total acid. | $NH_4$ salt of total acid. | $NH_4$ salt of total acid. |
| Conc., tons/acre | 0 | 0.2 | 1.0 | 5.0. |
| No. of drops | 23 | 34 | 39 | 67. |
| Duplicate test | 21 | 31 | 36 | 72. |

Table I shows that the clay becomes progressively more stable with incremental additions of the ammonium salt of the coke acid.

TABLE II
Water Drop Test

| | Sample | | | | |
|---|---|---|---|---|---|
| | e | f | g | h | i |
| Soil | Clay | Clay | Clay | Clay | Clay. |
| Additive | None | Coke acid. | Coke acid. | Na salt of coke acid. | Na salt of coke acid. |
| Conc., tons/acre | 0 | 1 | 5 | 1 | 5. |
| No. of drops | 30 | 44 | 32 | 200 | 190. |

It may be seen from Table II that the sodium salts are effective soil stabilizers, and that the coke acids themselves have little effect on soil stability.

TABLE III
Wet-Sieving Test

| | Sample | | | | | |
|---|---|---|---|---|---|---|
| | j | k | l | m | n | o |
| Soil | Clay | Clay | Clay | Clay | Clay | Clay. |
| Additive | None | Soluble acid $NH_4$ salt. | Soluble acid $NH_4$ salt. | Total acid $NH_4$ salt. | Insoluble acid $NH_4$ salt. | Commercially available product. |
| Conc. ton/acre | 0 | 1 | 3 | 3 | 3 | 3. |
| Percent on sieves: | | | | | | |
| 20 | 17.5 | 28.0 | 81.0 | 15.8 | 16.9 | 34.0. |
| 40 | 40.5 | 39.0 | 10.0 | 38.8 | 35.7 | 36.5. |
| 60 | 14.5 | 12.5 | 3.0 | 15.8 | 16.8 | 9.5. |
| Total lost | 27.5 | 20.5 | 6.0 | 29.6 | 30.6 | 20.0. |

Table III clearly shows the superiority of the $NH_4$ salts of the soluble acids. The test demonstrates the aggregate stability of the soil (the greater the resistance to being washed through the screen and the greater the amount on the coarse screens, the greater is the stability of the soil).

TABLE IV
Wet-Sieving Test

| | Sample | | | | | | |
|---|---|---|---|---|---|---|---|
| | p | q | r | s | t | u | v |
| Soil | Salt lm | Salt lm | Salt lm | Salt lm | Salt lm | Salt lm | Salt lm. |
| Additive | None | Soluble acid $NH_4$ salt. | Soluble acid $NH_4$ salt. | Soluble acid $NH_4$ salt. | Commercially available product. | Commercially available product. | Commercially available product. |
| Conc. ton/acre | 0 | 1 | 1½ | 2 | 1 | 2 | 3. |
| Percent on sieves: | | | | | | | |
| 20 | 1.3 | 3.7 | 7.3 | 19.0 | 4.7 | 5.3 | 14.3. |
| 40 | 3.3 | 8.7 | 16.3 | 20.0 | 8.7 | 13.7 | 15.3. |
| 60 | 4.7 | 9.3 | 12.7 | 13.0 | 6.7 | 8.0 | 8.7. |
| Total lost | 90.7 | 78.3 | 63.7 | 47.4 | 79.9 | 73.0 | 61.7. |
| Total remaining | 9.3 | 21.7 | 36.3 | 52.6 | 20.1 | 27.0 | 38.3. |

A comparison of the total amounts of soil remaining and lost, from the above table, clearly shows that the product of the present invention provides a high degree of stability as compared to a formulated, commercially available product.

I claim:
1. A water soluble salt product prepared by a process comprising:
   (a) oxidizing for 5 to 24 hours petroleum coke in aqueous, 20–80% by weight nitric acid at temperatures between about 50° C. to 125° C., wherein the weight ratio of petroleum coke to aqueous nitric acid is between about 1:2 to 1:10, thereby forming petroleum coke acid; and
   (b) neutralizing said petroleum coke acid wtih sufficient base, said base being selected from the class consisting of alkali metal hydroxide and ammonium hydroxide.

2. The process of claim 1 wherein said aqueous nitric acid runs between 35–55% by weight nitric acid.

References Cited
UNITED STATES PATENTS 2,461,740  2/1949  Kiebler _____ 260—515
3,259,650  7/1966  Decker et al. _____ 260—515

JAMES A. PATTEN, Primary Examiner

U.S. Cl. X.R.

71—24, 114